United States Patent [19]

Myers

[11] Patent Number: 5,074,950
[45] Date of Patent: Dec. 24, 1991

[54] WEAVING MACHINE FOR MAKING FIBERGLASS GRATING WITH IMPROVED TENSION CONTROL OF FIBERGLASS STRANDS DURING LAYUP

[76] Inventor: Robert E. Myers, 18507 Prince William La., Nassau Bay, Tex. 77058

[21] Appl. No.: 535,220

[22] Filed: Jun. 8, 1999

[51] Int. Cl.⁵ .................... B65H 65/00; B65H 69/00; B65H 77/00
[52] U.S. Cl. .................................. 156/433; 156/166
[58] Field of Search ........ 156/433, 434, 393, 440–441, 156/166

[56] References Cited

U.S. PATENT DOCUMENTS

| | | | |
|---|---|---|---|
| 3,678,147 | 7/1972 | Patchen | 264/277 X |
| 3,755,054 | 8/1973 | Medney | 156/441 X |
| 3,772,126 | 11/1973 | Myers | 156/441 X |
| 4,735,672 | 4/1988 | Blad | 156/433 X |

Primary Examiner—Michael W. Ball
Assistant Examiner—Adrieme C. Johnstone
Attorney, Agent, or Firm—Sughrue, Mion, Zinn, Macpeak & Seas

[57] ABSTRACT

A weaving machine alternately lays catalyzed resin wetted fiberglass strands within respective right angle sets of uniformly spaced, open-ended intersecting slots within the upper face of a weaving form by driving reciprocating carriages mounted on rails via rotating wheels across the top of the form bearing said right angle sets of uniformly spaced, open-ended slots. A horizontal base plate supports hydraulic cylinders whose projectable and retractable piston rods suspend a running bar having horizontal apertures through which the fiberglass strands pass. After passage across the form, the running bar is dropped to force the wetted strands into aligned slots. Detents engage the strands at each side of the open slots. A hydraulic rotary motor has a rotary drive shaft in the form of a horizontal threaded rod passing through and engaging the threads of a horizontal tapped bore of a nut fixed to the carriage base plate. The hydraulic motor is rotated bidirectionally to reciprocate the carriages across the form. Resin tanks bearing resin wet the fiberglass strands prior to weaving, with the strands wrapped about the peripheries of three laterally adjacent, spaced, parallel tension bars within the tank. Tensioning is varied by raising or lowering the center tension bar to cause more or less wrapping of the strands about all three tensioning bars.

8 Claims, 4 Drawing Sheets

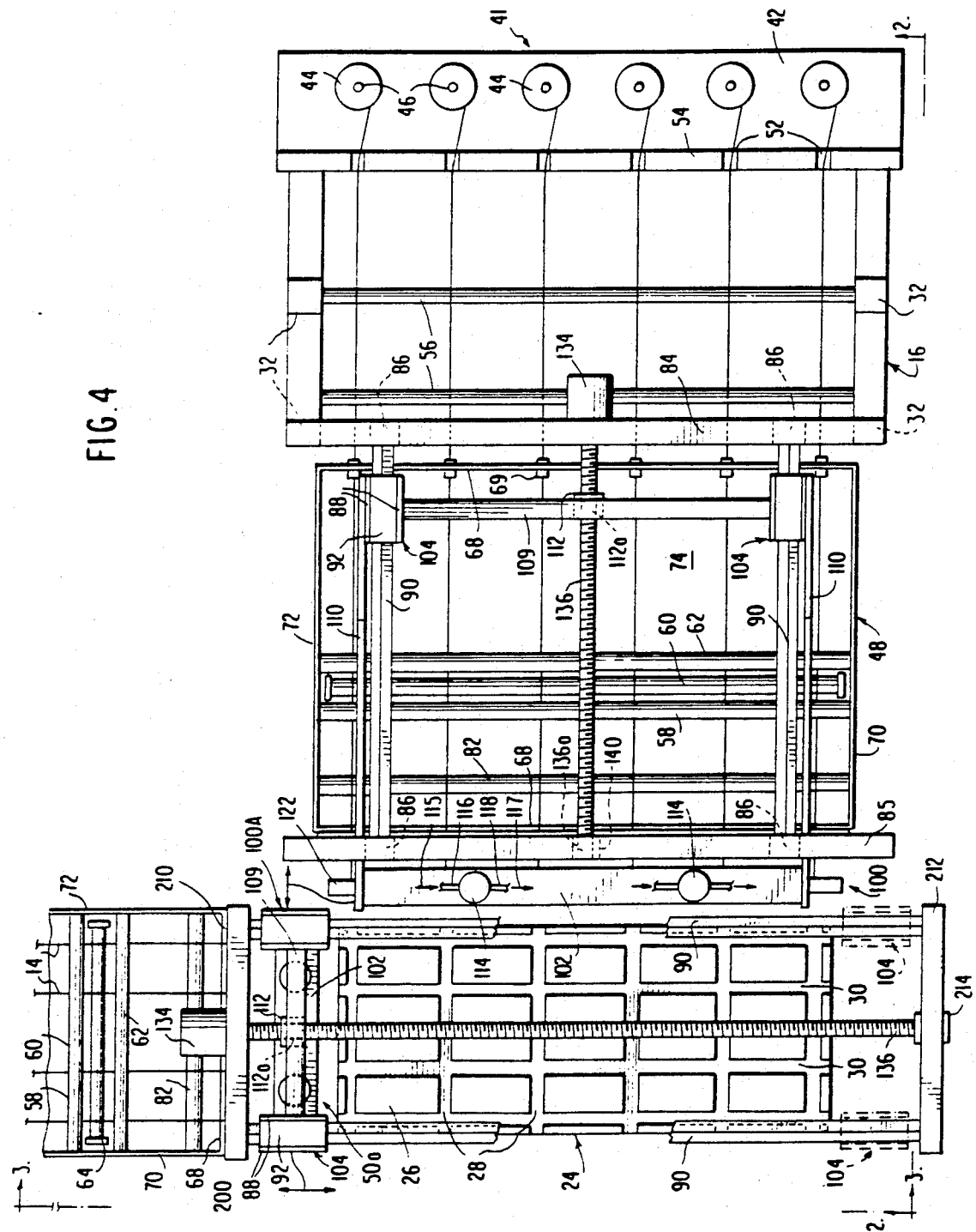

WEAVING MACHINE FOR MAKING FIBERGLASS GRATING WITH IMPROVED TENSION CONTROL OF FIBERGLASS STRANDS DURING LAYUP

FIELD OF THE INVENTION

This invention relates to a weaving machine for laying catalyzed resin wetted fiberglass strands within right angle sets of uniformly spaced open ended slots within an upper face of a weaving form, and more particularly to a weaving apparatus which provides uniform tension of the fiberglass strands during layup and which results in increased density and uniformity of the fiberglass strands within the compression molded grating resulting therefrom.

BACKGROUND OF THE INVENTION

The present invention relates to an improvement within applicant's compression molded fiberglass grating apparatus as set forth in applicant's prior U.S. Pat. No. 3,772,126, issued Nov. 13, 1973. The apparatus of applicant's prior patent requires initially a rectangular metal block weaving form to be positioned on an underlying support with a top face bearing first and second sets of spaced parallel open ended slots, with respective sets of slots intersecting at right angles and weaving means for repetitive placement of continuous strands of resin wetted fiberglass alternately within respective slots of each set in a zig-zag manner. Projectable and retractable detents provided on the form at the open ends of the slots are engageable by the fiberglass strands to facilitate zig-zag depositing of the strands in the slots with the detents projected to hold the strands during the zig-zag layup and retracted to allow lay of the preceding layer of strands with spaced parallel slots.

In a true sense of the word, the strands are not woven, but are alternately layed in the slot, first in one direction and then in the opposite direction, with the detents acting at respective ends of the slots of the two sets, to hold strands at their overlapping reversing point at the end of the slots as they are filled into the slot, by the weaving machine running bar reversing direction, after the strands engage respective detents.

The manner of operation of the apparatus of the '126 Patent involves swinging a pair of substantially L-shaped weaving arms over the form in directions running respectively parallel to the slots of the two sets such as from front to back of the rectangular block form for one set of slots and from one lateral side to the other for the second set of slots. In swinging of the arm through a 180° arc, to effect placement of the wetted strand within given parallel slots with the strands passing through spaced parallel apertures within the arms, the strands are required to follow a full 180° arcuate path to a maximum vertical height at the center of the arc, significantly above the top of the form bearing the rectangular slots.

The applicant has found that such action inherently varies the tension of the strands as they are deposited within the slots due to the excessive travel of the strands about the arcuate path of the swinging arms. Additionally, while the wetted strands frictionally engage movable and static components of the apparatus such as the apertures within the swinging arm and apertures within the resin tank where they are initially directed for wetting by the catalyzed resins prior to deposit within the sets of slots, the tension set up during wetting has been inadequate to insure uniform layup and achievement of desired density of the fiberglass reinforcing strands within the molded resin grating.

It is therefore a primary object of the present invention to provide an improved weaving machine for the making of a fiberglass reinforced compression molded grating, wherein the catalyzed resin wetted fiberglass strands are more quickly inserted within the sets of spaced parallel slots of the weaving form, wherein the wetted fiberglass strands are subjected to continuous, uniform tension throughout the wetted strand insertion step, wherein tension on the strands may be readily varied depending upon the nature of the catalyzed resins being applied to the fiberglass strands and wherein the depositing of the catalyzed resin wetted strands in zig-zag fashion within the slotted form reduces the time span between wetting of the strands, weaving thereof into the grating form, transfer of the strands from the form to the preheated female mold, and the compression and curing of the resin within preheated male and female mold halves at a downstream press station.

With the foregoing objects and features in view, and such other objects and features which may become apparent from the specification, the invention will be understood from the following description taken in conjunction with the accompanying drawings in which like numerals designate like parts.

BRIEF DESCRIPTION OF THE DRAWINGS

FIG. 4 is a top plan view of the weaving machine of FIGS. 2 and 3.

DESCRIPTION OF THE PREFERRED EMBODIMENT

Figure 1:
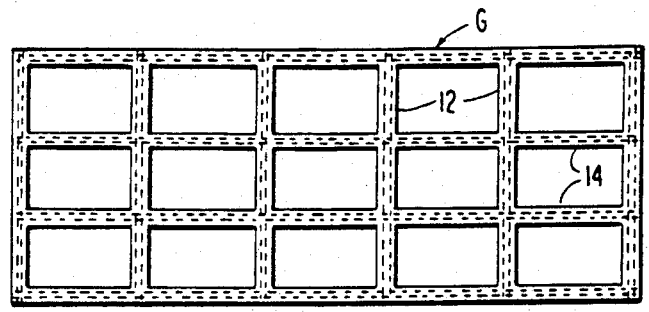
FIG. 1 is a top plan view of a completed grating using the apparatus of the present invention.

Referring to the drawings, FIG. 1 illustrates a completed fiberglass reinforced compression molded grating designated G, having a determinate size, taking a rectangular plan form and consisting of one set of spaced parallel fiberglass strands 12 crossing with a second set of such strands 14 at an angle. In the illustrated Figure, the two sets of strands 12, 14 cross at right angles, but the angles may be acute or obtuse, as desired. The grating G is essentially that shown at FIG. 3 in the prior '126 Patent. However, the invention has broader application to a weaving machine in which the spaced parallel catalyzed resin coated fiberglass strands are not subsequently heated and compressed in a press at a downstream station, but are caused to be set within a mass of cured resin without the compression of the wet fiberglass strands, although the compression molded form of grating is preferred.

Similar to U.S. Pat. No. 3,772,126, the grating G is formed from fiberglass strands by a weaving machine indicated generally at 10 in the FIGS. 2-4. The machine is constituted by an open frame indicated generally at 16 formed about and in conjunction with a supporting table 18, having a flat, horizontal table top 20 supported at opposite ends by vertical legs or risers 22. The use of table 18 is in a schematic sense since its function is to stationarily support a rectangular, metal, parallelepiped weaving form indicated generally at 24. In actuality, the form 24 is preferably supported by wheels or rollers (not shown) positioned so as to move from right to left, FIG. 2 along laterally spaced longitudinally extending rails (not shown) such that the weaving form 24 after receiving first and second sets of catalyzed resin wetted fiberglass strands 12, 14 alternately crossing with each other, is then moved to a downstream station where the weaving form is inverted and the wet strands forced to move out of the weaving form and into an underlying female mold (not shown). Subsequent to that transfer the female mold cooperates with a vertically reciprocating male mold (not shown) at the press station, closing off the slots within the female mold within which the wetted strands reside while subjecting simultaneously the hot resin wetted strands to both heat and intense pressure by compression action of forces acting on the male and female mold in a classic, heated compression mold process.

Figure 2:
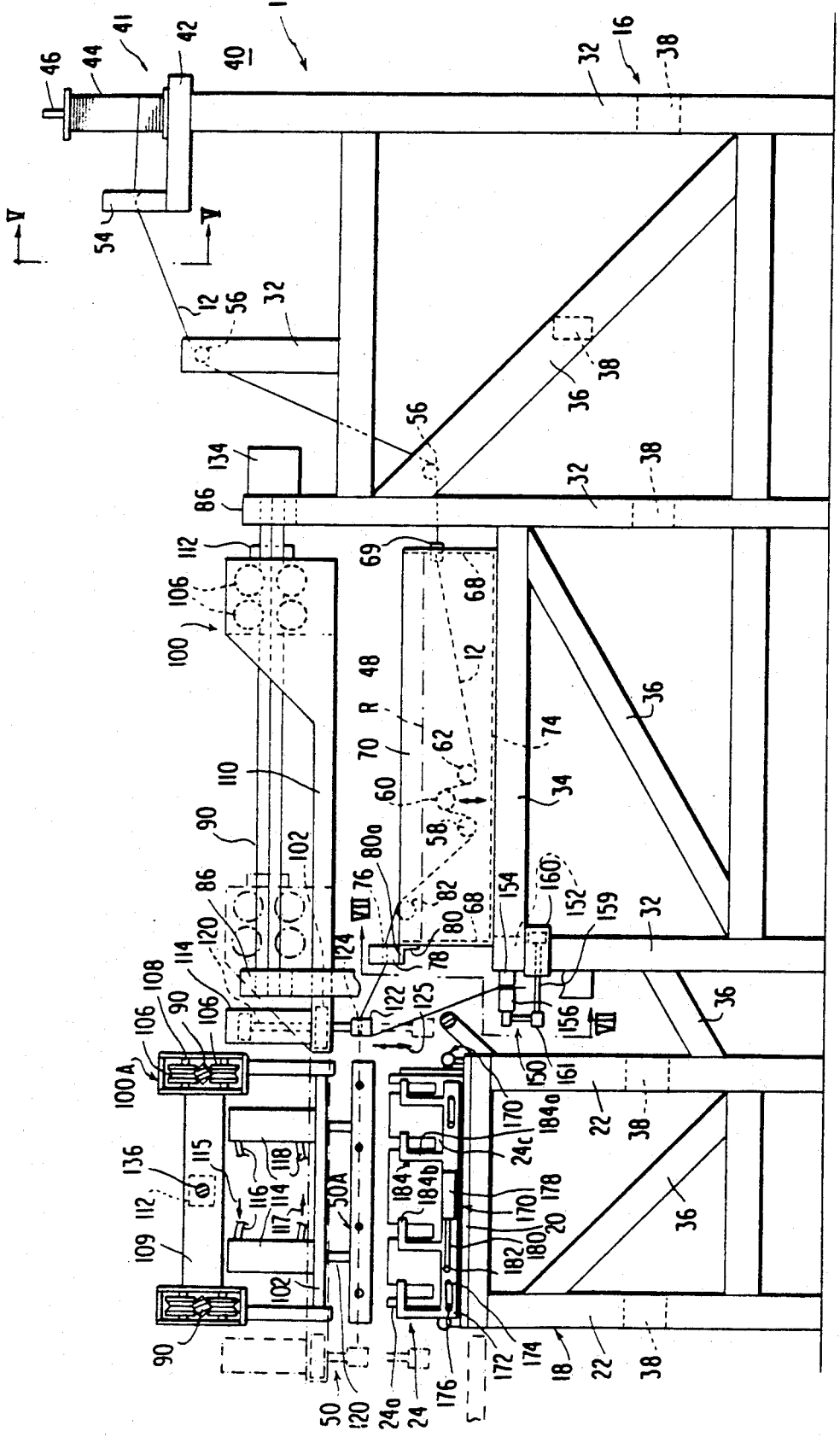
FIG. 2 is a front elevational view of the improved weaving apparatus for making a compression molded fiberglass reinforced resin grating forming a preferred embodiment of the present invention.

The present invention is directed to the initial weaving machine or apparatus at the first upstream, weaving station, as partially depicted in FIG. 1. As seen best in FIG. 4, which is a plan view of the weaving machine, rectangular block (parallelepiped) form 24 has within a top face 26, one set of longitudinally spaced parallel, open-ended horizontal slots 28, and a second set of spaced parallel, open-ended slots 30 which intersect the slots 28 at a desired angular relationship, in this case at right angles as shown. The table 18 is integrated into the open framework 16 and for illustrative purposes that framework consists of a series of vertically upright risers 32 and longitudinal, horizontal beams 34 joined thereto, For reinforcing purposes, and to rigidify the frame, oblique reinforcing members 36 span between the vertical risers 32 and the horizontal beams 34. The open framework 16 is of elongated rectangular form, and vertical risers 32 at opposite sides of the weaving machine 10 are joined by various transverse horizontal beams 38. At an upstream end 40 of the machine, vertical risers 32 support a transversely extending beam 42, particularly defining spool support assembly 41 and which functions as a horizontal support for a plurality of spools 44 carried by vertical upright studs 46 affixed to the beam 42 at longitudinally spaced positions along the length of the beam 42. The spools 44 permit the unwinding of a strand 12 of fiberglass from the center of each spool. The fiberglass strands 12 are led to a transversely extending, upwardly open rectangular resin pan or resin tank indicated generally at 48 which is fixed to and supported by the open frame 16, particularly via a pair of horizontal beams 34 to opposite sides of framework 16 of the machine 10. The function of resin pan 48 is to wet the fiberglass strands 12 prior to their being woven into the respective slots 28, within the upper face 26 of weaving form 24. A second resin pan 48A is provided in the machine 10 for wetting strands 14 prior to their being woven into crossing slots 30 within form 24. In FIG. 2, principally the right side or upstream end components of weaving machine 10 are illustrated in detail. Duplicate means are thus provided at 41A for supporting other spools 44 of fiberglass forming the cross strands 14 to the rear of the form 24 from that illustrated in FIG. 2, along with the mechanism for effecting the weaving of the strands 12 onto the form 24 and within the slots thereof as a substitute for the oscillating generally L-shaped arms within the apparatus of prior U.S. Pat. No. 3,772,126. Further, while a description will be given of duplicate mechanisms of the weaving machine 10 which are incorporated within the machine 10 at right angles to the disposition of the spool support assembly 41, FIG. 2, and a reciprocating running bar assembly indicated generally at 50, FIG. 2. The following description of the machine components for the laying of the strands 12 longitudinally within slots 28 of weaving form 24, i.e., the operation of assemblies 41 and 50 of one-half of the weaving machine 10 are more detailed than to the duplicate assemblies 41A and 50A disposed at right angles thereto. In assemblies 41 and 41A, as well as 50 and 50A, like elements are given like numerical designations. The same is true for the respective resin pans 48 and 48A, since it is the resin pans which include the variable tensioning means for the fiberglass strands 12, 14 as they are wetted by the resin and prior to weaving of these strands back and forth within respective slots 28, 30 of the weaving form 24.

Figure 6:
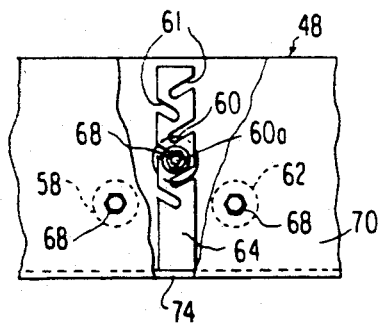
FIG. 6 is an enlarged side elevational view, partially broken away, of one resin tank of the weaving machine.
Figure 7:
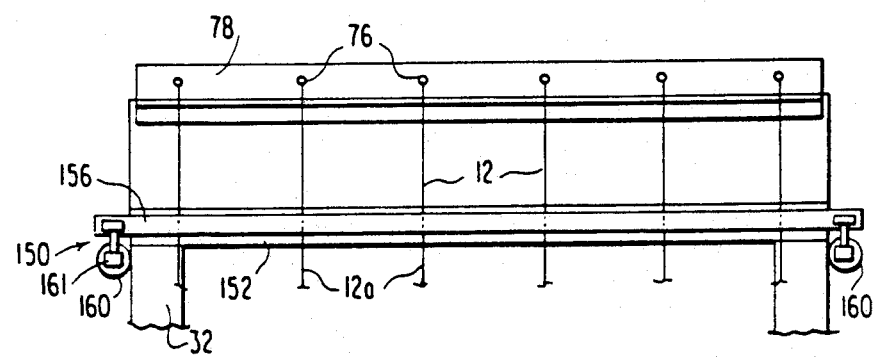
FIG. 7 is a vertical sectional view taken about lines VII.

Upwardly open elongated resin pan 48 is adapted to receive strands 12 which first pass through vertical guide slots 52 within the top of a guide bar 54 fixed to beam 42 and extending transversely over the full length of the beam 42 bearing the spools 44. Spools 44 are positioned at some vertical height above the resin tanks 48, 48A to permit workers to pass under the non-wetted strands for access to various parts of machine 10. As the strands 12 are drawn off the center of the spools 44 under tension, they ride over or under one or more fixed cylindrical bars 56 mounted to frame 16 intermediate of spools 44 and resin tank 48. The resin tank 48 is provided with a catalyzed resin R to a level of three transversely extending, parallel, relatively fixed tension bars or breaker bars 58, 60 and 62, (from left to right) FIGS. 2 and 4. The breaker bars are of cylindrical rod form. In the illustrated embodiment, breaker bar 60 is mounted for vertical adjustment via small diameter threaded rod extensions 60a at opposite ends which project through selected horizontally aligned ones of vertical spaced oblique slots 61 within opposed vertical risers 64, FIG. 6, internally of the resin tank 48. In the illustrated embodiment, nuts 68 are threaded onto the rod threaded ends 60a to hold the rod 60 at a desired height above the bottoms of the resin tank 48. The resin tanks 48 and 48A are completed by laterally opposed side walls 68, a front wall 70, a rear wall 72 and a bottom wall 74. The fiberglass strands 12 enter the interior of right side wall 68, to the side proximate to the spools 44, via respective small diameter holes 69 sized to the diameter of the strands 12, so that the presence of the strands 12 seals the holes, with the resin R above the holes 69. By raising the middle tension bar or breaker bar 60, the fiberglass strands 12 are forced to take a longer path and one which wraps about a greater portion of the periphery of the three tension bars 58, 60, 62, thus increasing the friction acting on the moving, wetted strands 12, and thus increasing the tension of those strands as they pass through the resin tank 48. The wetted strands 12 next pass through the apertures 76 within a sizing bar 78, which is affixed to the top of the upper edge of the left side wall 68 of the resin tank 48. In emerging from the mass of catalyzed resin R, the strands 12 are thoroughly soaked and coated with the resin. The sizing bar apertures or holes 76 are sized so that a surface coating portion of that resin R carried by the strands is prevented from passing through the sizing bar apertures 76, and runs down over the right side of the sizing bar 76, FIG. 4, and across the horizontal base 80a of an L-shaped supporting strip 80 which mounts the sizing bar 78 to the upper edge of the resin tank side wall 70. The excess resin R drips from edge of the base 80a back into the interior of the resin tank 48. In passage to the sizing bar 78, the strands 12 ride over a fixed transverse cylindrical guide bar 82 adjacent the open top of the resin tank 48.

A second, principle aspect of the invention resides in the make up and operation of the running bar assemblies 50 and 50A. Running bar assembly 50 is illustrated in FIG. 2 to the right of the form 24 and longitudinally aligned therewith and intermediate of table 18 and the portion of frame 16 supporting strand reels 44 on transverse beam 42. The companion running bar assembly 50A for inserting strands within slots running front to rear within the top surface 26 of form 24 lies to the rear of the Table 20 and to the rear of form 24, is oriented 90° to the running bar assembly 50 and operates alternately to running bar assembly 50. As mentioned previously, like elements in the two assemblies are given like numerical designations. A more detailed description will be set forth herein with respect to running bar assembly 50. The open frame 16 includes at least two vertical risers 32 at the front and rear of the machine supporting at their upper end, transverse cross beam 84. Beam 84 supports mounting blocks 86 at opposite ends, which fixedly mount one end of horizontally extending, diamond-shaped cross-section rails 90. Rails 90 are of sufficient length to permit a carriage indicated generally at 100 to move in the direction of the longitudinal axis of the weaving machine 10 from a position oriented at or beyond the left side 24a of the form 24 to a position beyond the right side 24b thereof. A second cross beam 85 mounted to the upper ends of riser 32, spans from front to rear. FIG. 4 and fixedly supports the ends of rails 90 remote from motor 134 via mounting blocks 86. The carriage 100 is comprised of a horizontal sheet metal carriage cross beam 109 such as steel which is of a length somewhat shorter than the distance between the front to rear spaced rails 90. The carriage cross beam 109 is welded at opposite ends or otherwise affixed to mating carriage wheel housings 104. Wheel housings 104 are of rectangular open box form, consisting of laterally opposed vertical walls 88, a top wall 92 and a bottom wall 94. Projecting through the vertical walls 88 at positions above and below rails 90 are pins or axles 108 which support for rotation thereon upper and lower matching sets of wheels 106 having V-shaped peripheries. Wheels 106 are spaced vertically a distance equal to the thickness or vertical height of the diamond-shaped cross-section rails 90. The location of the wheels 106, mounted for rotation on respective axles or pins 108, are illustrated in FIG. 2. As a result, the carriage cross beam 106 spans between the longitudinally directed, front to rear spaced rails 90 supported by upper and lower sets of wheels 106 within carriage wheel housings 104. The carriage cross beam 109 fixedly mounts a stationary nut 112 centered between the carriage wheel having a horizontal tapped axial bore 112a. Carriage assembly 100 includes laterally spaced sidewalls 110 fixed at one end to outside faces of wheel housings 104 and at the opposite end to opposite ends of carriage base plate 102. Carriage base 102 is cantilever mounted near opposite ends of the carriage cross bar 109 there are fixed respective vertically upright hydraulic cylinders 114. Hydraulic fluid as indicated by arrows 115, 117 is alternatively supplied and relieved from the hydraulic cylinder 114 via dual hydraulic fluid lines or hoses 116, 118, respectively. Projecting downwardly from the bottom of each hydraulic cylinder is a hydraulic cylinder piston rod 120, whose outer axial end is affixed to a horizontally extending metal running bar 122. The running bar 122 includes a series of longitudinally spaced, horizontal apertures or holes 124 which are sized to receive the strands 12 after they are wetted by resin R within the resin tank 48. The holes or apertures 124 constitute a horizontally aligned array through the center of the running bar 122. As indicated by the double-headed arrow 125, the running bar 122 may be raised or lowered by the selective application of hydraulic fluid and removal of hydraulic from the hydraulic cylinders 114. After passage through apertures 124, the wetted strands 12 which initially feed from the spools 44 have their free ends 12a projected downwardly between a horizontally movable clamping member 156 and a fixed horizontal clamping bar or member 154 of a clamping bar assembly indicated generally at 150, affixed to the end of a transverse cross beam 156 mounted to vertical faces of front and rear risers 32 of the open frame 16.

Clamping bar assembly 150, and its corresponding structure 150A have like elements with like numerical designations. In this respect, the clamping bar assembly 150 includes horizontal cross beam 152 which forms a part of the open frame 16 and extends from the front of the machine, FIG. 2, to the rear. Mounted to the cross beam 152 is the stationary clamping bar 154 which extends horizontally and transversely from front to rear of the machine and at right angles to the longitudinal path of travel of the carriage 100. Hydraulic cylinders 160 are mounted to the stationary clamping bar and each includes an extendable and retractable piston rod 159 which projects axially outwardly of one end of the hydraulic clamping cylinder 160 at opposite ends of the stationary clamping bar 154 and is fixed to movable clamping bar 156 via link 161. By selective application of hydraulic fluid to and removal from the hydraulic clamping cylinders 160, the shiftable clamping bar 156 is moved toward and away from the stationary clamping bar 154. When the piston rod is fully extended, gap G between the shiftable clamping bar 156 and the stationary clamping bar 154 permits the free ends 12a of the strands to pass by gravity between members 154, 156. Reversal of hydraulic fluid flow through lines 162, 164 causes the retraction of the piston rods 166 of the respective hydraulic clamping cylinders 160 to frictionally clamp the free ends 128 of the strands. The clamping bar assembly 150 is located at a vertical height somewhat below the slots 28 within the form 24. With the running bar 122 in vertically raised position, just beneath the carriage plate 102a, the movement of the carriage 100 along rails 90 to the left, FIG. 2, causes the wetted strands 12 to be pulled out of the resin R within the resin tank 48 with the free end 12a of the various strands clamped between movable clamp bar 94 and the fixed clamping bar 96. A doubled back portion of each of the strands 12 occurs during passage of the carriage 100 from right to left over the full length of travel from the right side 24b of form 24 to the left 24a thereof as shown on dotted lines, FIG. 2.

That action is caused by operation of a hydraulic motor at 134 having a threaded output or drive shaft 136 threaded through nut 112 horizontal bore 112a. The hydraulic motor 134 is fixedly mounted to transverse horizontal beam or support 84 which also mounts blocks 86 for fixedly mounting one end of each of the rails 90. The drive shaft 136 terminates remote from the hydraulic motor 134 in an idler bearing 140, which rotatably supports a non-threaded terminal portion 136a of drive shaft 136. The idler bearing 140 is fixedly mounted to the cross beam 84, which also supports mounting blocks 86 adjacent opposite ends thereof which in turn mount the ends of the rails 90 remote from similar mounting blocks 86 proximate to the hydraulic motor 134.

As may be seen in the various figures, particularly the top plan view of FIG. 4, the spools 44 mounted to vertically upright studs 46 permit the strands 12 to be drawn therefrom with their lengths aligned with respective slots 28 by movement from right to left of the carriage 100 which pulls the strands through the mass of resin R of resin tank 48 with the strands 12 interleaved about the cylindrical, parallel, relatively fixed tension bars or breaker bars 58, 60 and 62. The apparatus includes suitable microswitches or the like (not shown) to control application and termination of the supply of hydraulic fluid to the hydraulic motor 134 for effecting carriage movement, with the carriage plate 102a to the right of or at the right vertical face 24b of the form 24 to a position at or beyond the left face 24a, and vice versa. With the strands 12 riding above the top 26 of the form 24, upon actuation of hydraulic cylinders 114, extension of the piston rods 120, causes the dropping of the running bar 122 to the left of vertical face 24a of form 24, below the level of slots 28, thereby moving each aligned strand 12 into a respective longitudinal slot 28. Unlike the weaving machine or apparatus of my prior U.S. Pat. No. 3,772,126, the strands as shown in FIG. 2 of that Patent, do not take a circular arc path, as indicated by arrow 46 and the continuation thereof in dotted lines from the right side of the form, but reciprocate across the top of the open slotted form just above the slots 28. When the two hydraulic cylinders 114 are actuated by feeding hydraulic fluid thereto as per arrows 115, and removal therefrom at 117, the piston rods 120 of those hydraulic cylinders extend thereby causing the portion of the strands 12 from the sizing bar 78 adjacent the resin tank 38, to the left side of the form 24a, to move into the longitudinally extending slots 28 from one end of the form 24 to the other. A second portion of each strand 12 extends from running bar 122 back to the clamping bar assembly 95. At this point, travel of the carriage 100 terminates prior to retraction of piston rods 120.

Figure 5:
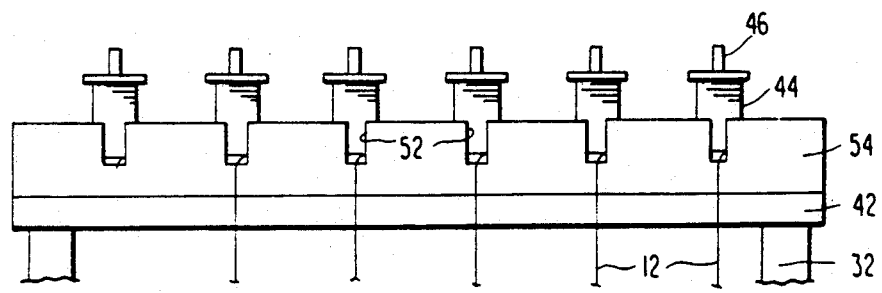
FIG. 5 is an enlarged sectional view of the machine of FIG. 2, taken about line 5—5 illustrating one spool support assembly thereof.

Selective operation of detents is then effected, in a manner which may be identical to that of my prior U.S. Pat. No. 3,772,126. Those detent mechanisms or detent assemblies 170 are seen in FIGS. 2 and 5, and reference may be had to FIGS. 1 and 2 of the '126 Patent, that patent incorporated by reference herein. Specifically, each of the opposite longitudinal vertical end faces 24a, 24b of form 24 as well as the front and rear vertical faces 24c, and 24d, respectively, is provided with a thin, rectangular cross-sectional slide bar 172 forming the principal member of each detent assembly 170. These slide bars 172 are each provided with a series of horizontally spaced, elongated horizontal slots 174 within which are located small diameter horizontal pins 176 which pass through the slots and which are fixed to a respective vertical faces 24a, 24b, 24c, 24d of form 24. Hydraulic cylinders 178 constitute fluid operators which effect selective, limited horizontal sliding of the slide bars 172. The hydraulic cylinders 178 are mounted to the top 20 of table 16 and are connected to a respective slide bar 172. Each hydraulic cylinder 178 includes an axially extendable and retractable hydraulic cylinder rod 180, with a rigid arm 182 affixed to the outboard end of the hydraulic cylinder rod 180, at right angles thereto and fixed at its opposite end to the slide bar 172. Detents 184 of inverted L-shaped configuration have vertical portions or fingers 184a extending upwardly from the slide bar 172, and terminate in horizontal, right angle terminal portions 184b which are extendable across the open ends of the longitudinal slots 28 and the transverse slots 30 (front to rear). When the slide bars 172 are slid in one direction, as in accordance with my issued U.S. Pat. No. 3,772,126, the detents 184 are disposed well to the side of the open ends of the slots 28, 30; however, when a given slide bar 172 is shifted hydraulically in the opposite direction on pins 176, limited by the length of the longitudinally spaced horizontal slots 174, the horizontal detent terminal portions of detents 184 extend across the open ends of the slot above the lower run of the strand from the clamping bar assembly 150 to the vertical face of the form remote from that clamping bar assembly. Upon raising running bar 122 above the level of the form 24, return movement of carriage 100 from left to right, FIG. 1, causes the strands 12 carried by the running bar 122 to wrap about detent portions 184 and move into overlying position with the previously layed section of the strands 12. During reverse movement of the carriage 100, with the running bar 122 moving in a direction towards the resin tank 48, there is no pulling of each of the strands 12 from its respective spool 44 at each spool location. Rather, each of the wetted strands 12 are stationary as the running bar 122 reverses with the apertures or holes 124 within the running bar moving over the wetted strands 12 until the running bar 122 is to the right of vertical wall 24b of form 24, FIG. 2. Whereupon the hydraulic cylinders 114 are again supplied with hydraulic fluid to cause the hydraulic cylinder piston rods to extend outwardly of the hydraulic cylinders and to drive the running bar 122 from the full line position, FIG. 2 vertically downwardly forcing the strands 12 to be reversely layed within their respective longitudinal slots 28. At this point, the detent assembly 170 proximate to vertical wall 24b of form 24 is operated by supplying hydraulic fluid to the hydraulic cylinder 178 of that assembly. The result is to cause the inverted L-shaped detents 184 to shift from a position where the end of the slots 28 are open to one where the horizontal terminal portions 184b of the detents close off that end of the slots. Each strand 12 is captured and awaits the next movement of the carriage from right to left, back over the top 26 of form 24. In preparation for that movement, however, the hydraulic cylinders 114 of the carriage must be supplied with hydraulic fluid in the opposite direction to retract the piston rods 120, raising the running bar 122 well above the top surface 26 of form 24 so that the carriage and the strand 12 carried thereby the running bar can move from right to left over the form 24 for subsequent strand 12 portion deposit in a repeat cycle after weaving of strands 14 at right angles to slots by operation of running bar assembly 50A. As already discussed, there are detent assembly slide bars 172 along the front and rear vertical faces 24c, 24d of form 24, as well as horizontally along the vertical surfaces 24a and 24b, and at right angles thereto. All four vertical surfaces of the form are thus provided with detent assemblies 170.

As the detents 84 at the right hand end of form 24 are projected across slots 28 and the carriage 100 is moved to the left, the strands 12 become hooked around the projected detents 184 at the right hand ends thereof, while, in the meantime, the detents at the left hand ends of the longitudinal slots 28 are moved to the side of those slots to permit depositing of the next runs or stretches of strands 12 into slots 28. When the carriage 100 moves to the left side of form 24 beyond vertical face 24A, those detents 184 are shifted from slot free position to detent, slot closed position. The reversal of carriage movement of carriage 100 then occurs and the carriage 100 is driven to towards the left side of the form 24 effected by reversal of rotation of hydraulic motor 134.

When the back and forth movement of the carriage 100 has deposited two successive stretches of strands 12 within the longitudinal slots 28, carriage 100 movement for running bar assembly 50 is terminated and movement of carriage 100A and its running bar assembly 50A is initiated. As mentioned previously, identical components having identical numerical designations are employed in assembly 50A. Successive back to front and front to back stretches or runs of strands 14 with their lengths aligned with respective slots 30 are laid down in transverse slots 30 from spools 44 located in line with those slots, after passage of strands 14 through resin tank 38A for wetting of the strands 14. The carriage 100' of running bar assembly 50A effects deposit of two already successive stretches of strands 14 in slots 30 over laid up strands 12 at the junctions or intersections of respective slots 28, 30.

Figure 3:
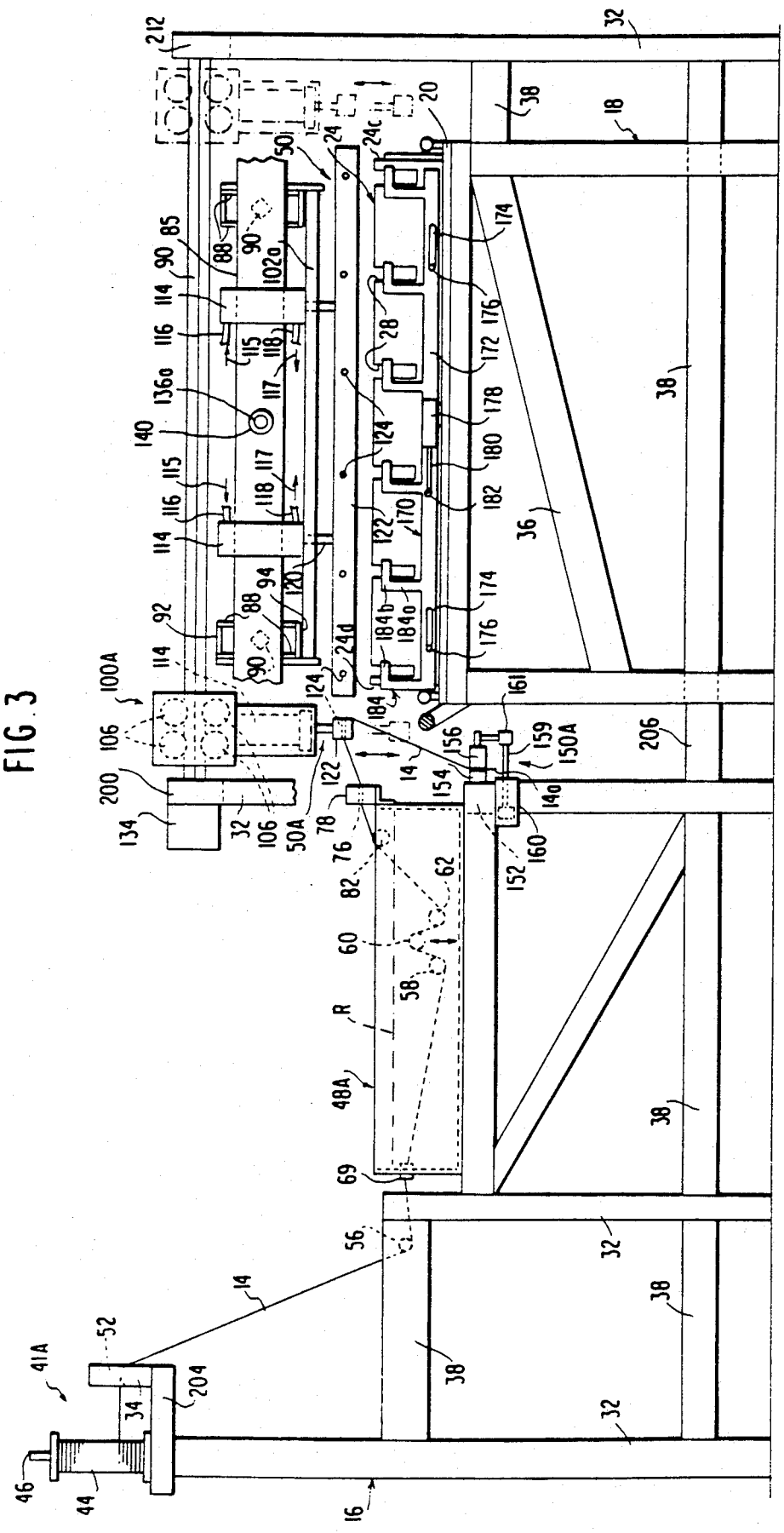
FIG. 3 is a side elevational view of the apparatus of FIG. 2.

Reference to FIGS. 3 and 4 illustrate the components of the near duplicate running bar assembly 50A. The principal difference in the running bar assembly 50A is the make up of the carriage 100A and the relative disposition and travel of that carriage 100A with respect to the hydraulic motor, the cross bar supporting the same, and the use of a single carriage base plate 102 supporting its running bar 122. Specifically, no physical interference, by the components of running bar assembly 50, which is to the right of the form 24 to movement of carriage 100 from the rear of the form 24 completely across the slotted open top 26 of the form and beyond the front vertical face 24c, and then return beyond the rear vertical face 24d of weaving form 24. Threaded drive shaft 136 extends over the area of form 24, supported by way of horizontal, rear beam 200 which is fixed via opposite mounting blocks 86 to vertical risers 32 of the open frame 16, and a front horizontal beam 202 extending parallel to beam 200 and being connected to beam 200 by laterally spaced diamond shaped rails 90. Carriage plate 102 of carriage 100A is similar to carriage plate 102 of carriage 100 of the running bar assembly 50. To the rear of beam 200 is a further beam 204 which extends horizontally, over a given longitudinal length of the machine 10 and supports a number of reels 44 at longitudinally spaced positions on the upper surface thereof by way of upright studs or pintels 46. Beam 204 is also part of the open frame 16, and is linked thereto by cross beam 206, FIG. 3. These elements form spool support assembly 41A from which strands 14 extend at respective spool locations in the direction of front to rear cross slots 30 within the upper face 26 of form 24. Strands 14 are led to resin tank 48A where the strands are wetted by resin R in the same manner as that occurring at resin tank 48 for strands 12. After passage through the tank 48A and after tensioning by the same tensioning mechanism as in resin tank 48, the strands 14 pass through apertures 76 within sizing bar 78 of the resin tank 48A and through horizontal apertures 124 of running bar 122 which is mounted beneath carriage plate 102, and which is raised and lowered by a pair of hydraulic cylinders 114 mounted in vertically upright position to opposite ends of carriage base plate 102. The carriage 100A takes the form of a compact assembly in a plan view, FIG. 4 with a transverse cross bar 206, FIG. 4, which fixedly mounts a nut 112 having a threaded horizontal bore 112a through which projects a threaded drive shaft 136 extending horizontally from hydraulic motor 134 of the running bar assembly 50A. It is noted, in this case, that the threaded drive shaft 136 terminates, in FIG. 4, beyond the front vertical face 24c of form 24, the purpose of which is to allow the moving carriage 100A and running bar assembly 50A to reciprocate over the top 26 of form 24 from the pull line positions shown in FIG. 4, to the rear of form 24 to beyond the front of that form as shown in dotted lines. Rails 90 extend beyond horizontal beams 210 and 212. Beam 212 mounts under block 214 rotatably supporting the end of threaded drive shaft 136, remote from hydraulic drive motor 134.

In all respects, the operation of running bar assembly 50A of the weaving machine 10 is like that of running bar assembly 50 described in greater detail. In this case, the initiation of movement of carriage 100A from the rear of form 24 in the direction of the front of the form 24, the termination of that movement and its reversal, along with the operation of respective detent mechanisms or assemblies 170 on the front face 24c and rear face 24d of the form 24 are effected in a similar manner as discussed in detail with respect to running bar assembly 50 at carriage 100.

Additionally, in the same manner as is effected for strands 12, a duplicate clamping assembly 150A is employed for clamping the free ends 14a of the fiberglass strands 14 during repetitive back and forth movements of carriage 100A, alternated with fore and aft movements of carriage 100 at right angles thereto for successive side to side and back to front runs of respective strands 12, 14. Selective, timed operation of the detent assemblies 170 capture the ends of the strands 14 laid down in slots 30 facilitating the maintenance of the strands 14 in position and the proper tensioning of the wetted strands during zig-zag lay down within the slots 30 of the form 24.

This completes one cycle of operation in a similar manner to that described in detail in my U.S. Pat. No. 3,772,126, which differs principally in the nature of the basic weaving elements specifically the running bar assemblies 50 and 50A and the resin tanks 48 and 48A with the tensioning means for the wetted strands 12, 14. The weaving procedure is repeated by alternate actuation of carriages 100 and 100A, and running bar assemblies 50, 50A respectively, until the slots 28, 30 are filled with stretches or runs of wetted, tensioned strands 12, 14 up to the level of the detent horizontal terminal portions 184b. The strands 12, 14 in the slots are then severed from the portions emanating from spools 144, where the strand free ends 12a and 14a pass through the clamping bar assemblies 150, 150A. This must be accomplished so that the form 24 can be moved from the weaving station table 18 prior to transfer of the woven grating G from the form 24 to the compression mold. That operation is in accordance with the description within my earlier U.S. Pat. No. 3,772,126. Preferably the form 24 is mounted on rails (not shown) and moved from the position shown in FIG. 2 further to the left where it is rotated so as to dump the wetted strands from the slots 28, 30 of the form into mirror image slots within the upper face of a bottom female mold half at a compression molding station (not shown).

While it is preferred to wet the fiberglass strands 12, 14 in the tanks 38, 38A prior to handling of the strands by the weaving machine running bar assemblies 50, 50A, it is possible, utilizing the apparatus of the present invention, to weave the fiberglass strands in a dry condition and to transfer the dry grating preform into the mold from the form 24. In such case, the fiberglass strands are wetted in the mold for subsequent compression and curing.

While in the foregoing there has been described and shown a preferred embodiment of the invention, various modifications and equivalents may be resorted to without departing from the spirit and scope of the invention as claimed.

What is claimed is:

1. In an apparatus for making a grating of a determinate size from fiberglass strands and including a parallelepiped weaving form provided on an upper face thereof with one set of spaced parallel, open-ended slots, and a second set of spaced parallel, open-ended slots intersecting the slots of the first set at an angle, means for depositing sets of fiberglass strands in a zig-zag manner in respective slots alternately crossing each other at the intersection of the slots, detent means engageable with the fiberglass strands at the end of the slots to facilitate zig-zag depositing of the strands in the slots, and means for projecting and retracting said detents across the open ends of the slots coordinated with the means for depositing sets of fiberglass strands within respective slots, the improvement wherein:

said depositing means comprises carriages, and means for supporting said carriages above and to respective right angle intersecting sides of said parallelepiped form for reciprocating movement selectively over the upper surface of said parallelepiped form, means for supporting said sets of fiberglass strands on said carriages for movement across the top of the parallelepiped form with their lengths aligned with respective slots, means for raising and lowering said fiberglass strands across their lengths vertically with respect to said form for selectively positioning of said aligned fiberglass strands in respective sets of slots at the end of travel of said reciprocating carriage for capture therein by said detent means, and motor means for driving said carriages alternately across said form, from one side to the other to alternately deposit said sets of fiberglass strands in a zig-zag manner in respective slots.

2. The apparatus as claimed in claim 1, wherein said carriage supporting means include rails extending parallel to opposite sides of said parallelepiped form towards and away from said form, said carriages each include:

a horizontal carriage cross beam, carriage wheel housings fixedly mounted to opposite ends of said carriage cross beam, sets of wheels rotatably mounted for rotation about horizontal axes within said wheel housing and engaging respective rails, a carriage base plate of a length generally corresponding to the length of the carriage cross beam, fixed to said means for mounting a running bar horizontally beneath said carriage base plate for movement vertically towards and away from the carriage base plate, longitudinally spaced apertures within said running bar slidably receiving said fiberglass strands, at positions corresponding to the spacing of respective slots within said parallelepiped form, and being in alignment therewith, and means caused by said carriage base plate for selectively raising and lowering said running bar with respect to said carriage base plate, and wherein said carriage is vertically positioned with respect to said form such that with said running bar in vertically raised position, said carriage is free to move across the top of said parallelepiped form, whereby weaving operation is effected by alternately reciprocating carriages of respective running bar assemblies across said form and deposition of said strands by selectively lowering said running bars beneath said carriage base plates after termination of carriage movement from one side of the form to the other to facilitate said zig-zag depositing of the strands in said slots, and engagement of the detent means with said deposited strands in coordination with the movement of respective carriages.

3. The apparatus as claimed in claim 2, wherein said carriage wheel housings are of hollow, rectangular cross section, including laterally opposed side walls and top and bottom walls, and wherein said set of wheels comprises at least one upper and lower wheel mounted for rotation about horizontal axes by axles projecting between the side walls of the carriage wheel housing, wherein said wheels have V-shaped grooves at the peripheries thereof, wherein said rails are of diamond-shaped cross section, and wherein said wheels are sized and positioned such that the V-shaped grooves in the peripheries thereof respectively engage the tops and bottoms of said diamond shaped cross sectional rails.

4. The apparatus as claimed in claim 1, wherein said means for driving said carriages comprise a stationery rotary hydraulic motor in juxtaposition to said rails and said carriage, said rotary hydraulic motor includes a rotatably driven, horizontal, elongated threaded drive shaft, said carriage cross beam fixedly mounting a nut having a horizontal threaded bore, sized to the diameter of said threaded drive shaft, said threaded shaft passes through said horizontal threaded bore of said nut and is in mesh therewith, such that upon supplying of hydraulic fluid to said hydraulic motor in reversible fashion, said motor rotates bidirectionally to cause said carriage to be driven bidirectionally across the top of said parallelepiped form.

5. The apparatus as claimed in claim 1, wherein said apparatus further comprises means for applying catalyzed resin to said fiberglass strands prior to depositing said strands in said open ended slots of said form, wherein said means for applying catalyzed resin to said fiberglass strands comprises a resin tank in fixed juxtaposition to said movable carriage means and to the side of said carriage means remote from said form, wherein said tank includes at least three laterally spaced, parallel cylindrical tension bars within said tank fixedly positioned and extending transverse to the path of movement of said fiberglass strands through said tank, wherein said fiberglass strands are partially wrapped about said plurality of tension bars, and wherein at least one of said tension bars is vertically adjustable with respect to the others to permit said fiberglass strands to wrap about a greater or lesser portion of the periphery of the laterally adjacent tension bars, thereby varying the friction acting on the moving fiberglass strands moving through said resin tank to vary the tension on said strands during wetting within said resin tank.

6. The apparatus as claimed in claim 5, wherein said resin tank comprises an upwardly open tank extending transversely across the path of movement of said strands, said tension bars comprise three in number, positioned side-by-side, and wherein said tank includes a vertical riser at each of opposite ends of a middle tension bar of said three bars and means for selectively fixedly mounting said middle tension bar at one of varying heights on said tank vertical risers and extending horizontally therebetween.

7. The apparatus as claimed in claim 6, wherein said tension bars are in the form of cylindrical, relatively small diameter cylindrical rods.

8. The apparatus as claimed in claim 5, wherein said tank includes side walls extending perpendicular to the direction of movement of the strands across the tank and in contact with said tension bars, and wherein horizontally aligned spaced apertures are provided within one of said side walls of the tank at positions generally below the level of resin therein, and wherein the apertures are sized relative to the strands so that the strands in moving through the apertures self-seal the apertures to prevent resin escaping from the interior of the tank through said apertures.

* * * * *